(12) United States Patent  (10) Patent No.: US 6,324,456 B2
Bosse  (45) Date of Patent: Nov. 27, 2001

(54) DRIVE TRAIN MANAGEMENT FOR A MOTOR VEHICLE

(75) Inventor: Rolf Bosse, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/740,310

(22) Filed: Dec. 18, 2000

Related U.S. Application Data

(63) Continuation of application No. PCT/EP99/03285, filed on May 12, 1999.

(30) Foreign Application Priority Data

Jun. 18, 1998 (DE) .............................. 198 27 133

(51) Int. Cl.[7] .............................. G06F 7/00; B60K 41/12
(52) U.S. Cl. .............................. 701/54; 701/53; 701/51; 477/37; 477/43; 477/107; 477/115
(58) Field of Search .............................. 701/51, 57, 60, 701/64, 53, 54; 477/43, 48, 110, 111, 15, 20, 46, 50, 37

(56) References Cited

U.S. PATENT DOCUMENTS

| | | | |
|---|---|---|---|
| 4,353,272 | * 10/1982 | Schneider et al. | 477/43 |
| 4,699,025 | * 10/1987 | Omitsu | 477/43 |
| 4,735,114 | * 4/1988 | Satoh et al. | 477/43 |
| 5,201,889 | * 4/1993 | Mason | 477/43 |
| 5,355,749 | 10/1994 | Obara et al. | 477/20 |
| 5,521,819 | 5/1996 | Greenwood | 364/424.1 |

FOREIGN PATENT DOCUMENTS

| | | |
|---|---|---|
| 3900320 | 5/1990 | (DE) . |
| 4432678 | 3/1996 | (DE) . |
| 19600915 | 7/1997 | (DE) . |
| 0474401 | 3/1992 | (EP) . |

OTHER PUBLICATIONS

Dynamische Stabilitats Control DSC der Baureihe 7 von BMW—Teil 1; ATZ automobiltechnische Zeitschrift 99 (1997) (pp. 134–140).

* cited by examiner

*Primary Examiner*—Jacques H. Louis-Jacques
(74) *Attorney, Agent, or Firm*—Baker Botts LLP

(57) ABSTRACT

In a method for online management of a drive train of a motor vehicle having a CVT transmission, in order to establish the engine speed for a required power output, a path through a predetermined composite performance graph—in which a performance quality characteristic is plotted as a function of power output and engine speed—is identified online, said path being optimal with respect to predetermined optimization criteria.

13 Claims, 3 Drawing Sheets

DRIVE TRAIN MANAGEMENT FOR A MOTOR VEHICLE

This application is a continuation of PCT International Application No. PCT/EP99/03285 filed on May 12, 1999, which International application was published by the International Bureau in German on Dec. 23, 1999.

BACKGROUND OF INVENTION

The invention relates to a method of drive train management for a motor vehicle having a CVT transmission, and more particularly a method of drive train management for online use, as well as a device for implementing the method.

In present-day motor vehicles, control of the engine and transmission is separate and independent. On the motor side, the application parameters corresponding to the desired operating point for the power required by the driver can be selected using efficiency performance data and established by a motor control unit. On the transmission side, in a motor vehicle with a continuously variable transmission (CVT transmission), an engine speed appropriate to the required power output is set. No feedback takes place between the engine and transmission for mutual optimization with regard to quality parameters such as emissions, fuel consumption, comfort, particulate emissions, noise, etc. Moreover, it is not possible to change the engine application or transmission application while the motor vehicle is being driven or operated.

An object of the invention is thus to create a dynamic method for drive train management as well as a corresponding drive train management unit.

SUMMARY OF THE INVENTION

In accordance with the invention a method is provided for online management of a drive train of a motor vehicle having a CVT transmission. In order to establish the engine speed for a required power output, predetermined efficiency performance data is provided, in giving performance quality as a function of power output and engine speed. Incremented changes in engine speed and power are selected with respect to said efficiency performance data, wherein the changes are selected to optimize operation with respect to the performance quality.

The efficiency performance data is preferably composite data representing a combination of multiple component performance graphs, where each performance graph describes a performance quantity to be optimized. Preferably the component performance graphs are normalized performance graphs, with each performance graph having its own normalization function. In other words, different normalization functions can be used for different performance graphs, although it is also possible to use one common normalization function. Furthermore, each component performance graph may be multiplied by a weighting function, where the weighting function can be a time-dependent factor. Doing so affords the option of introducing time effects, for example the aging of a motor, into the efficiency performance graph to be optimized.

Furthermore, a composite performance graph can be composed of different component performance graphs of the same charactistic, by which means an aging effect can be taken into consideration.

The predetermined performance graphs may advantageously be supplemented by the measurement of individual performance characteristics during driving operation, thus achieving improved adaptation of the performance graphs that represent the actual conditions of the motor vehicle.

The optimization strategy can advantageously be selected during operation, for example in that input from the driver specifies the optimization strategy.

Fuel consumption, NOx emissions, particulate emissions, noise and/or power output are examples of optimization characteristics that may be considered.

It is advantageous for the maximum possible adjustment capability of the power output for each predetermined time cycle and the maximum possible transmission adjustment capability for each time cycle to be established by a driving test, and for these established values to be taken into account in the optimization.

Apparatus for carrying out the method described above includes a control unit for the internal combustion engine, a control unit for the CVT transmission, and a control unit for the drive train management system, where the control units are advantageously interconnected by a bus, preferably a CAN bus.

In this context, the drive train control unit outputs the fuel injection quantity as the regulated quantity to the engine control unit, and outputs the drive ratio as the regulated quantity to the transmission control unit.

Preferred embodiments and details of the invention are described below with reference to the drawings.

DESCRIPTION OF THE INVENTION

Figure 1:
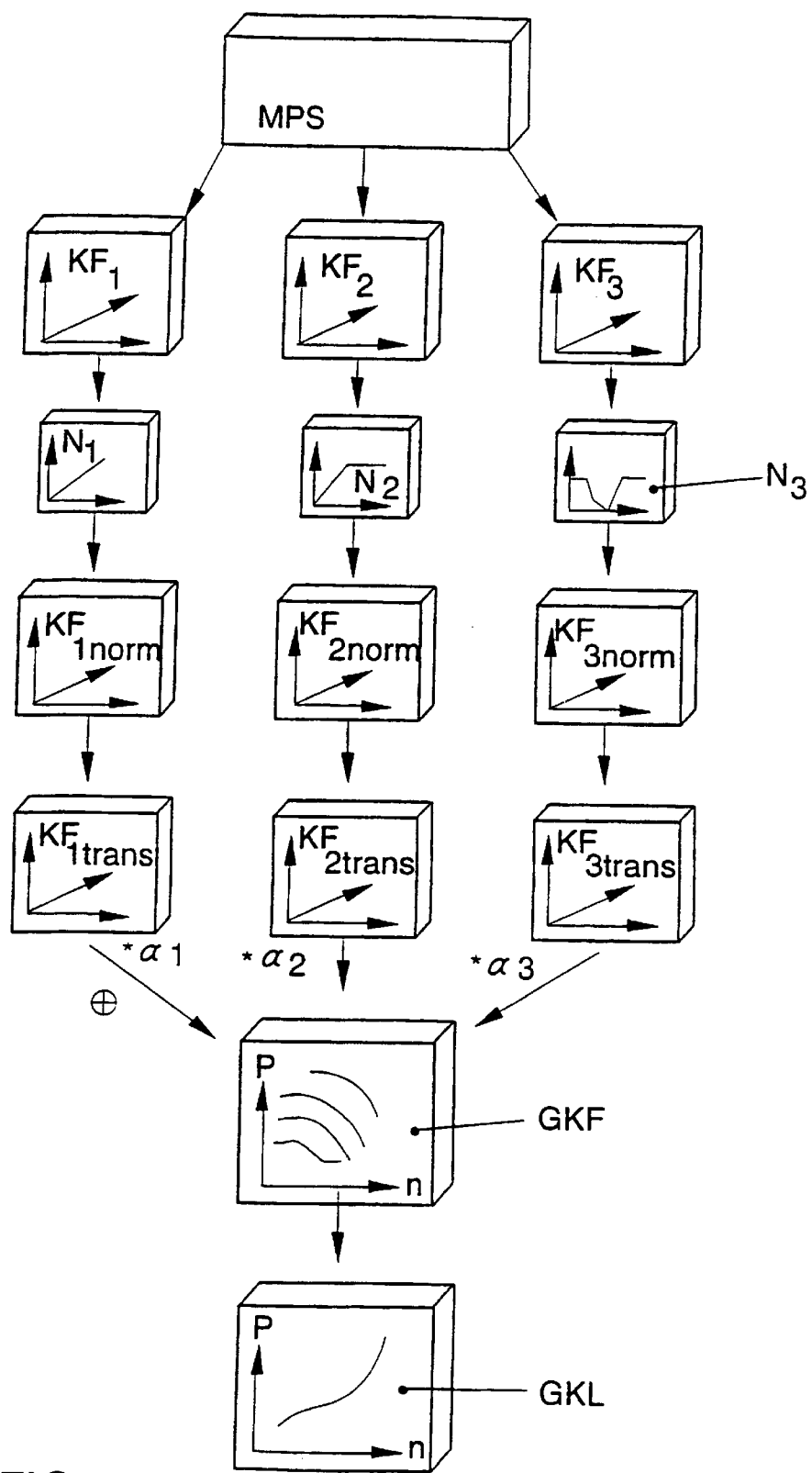
FIG. 1 shows a schematic representation of the method for determining an optimum performance characteristic curve.

FIG. 1 shows a schematic representation of the method for online determination of an optimum composite performance quality characteristic curve from predetermined component performance graphs. Component performance graphs $KF_1$, $KF_2$. . . $KF_n$, are determined on an engine test stand MPS. Each component performance graph comprises data representing a specific performance characteristic as a function of torque or power and engine speed. Thus, for example, $KF_1$, could be a performance graph relating to NOx emissions; $KF_2$ a performance graph concerning the particle count or particulate emissions; and $KF_n$ a performance graph for fuel consumption. Other arrangements are also conceivable as well, for example $KF_1$ could be a performance graph relating to NOx emissions of a new engine, $KF_2$ the NOx emissions of an engine that has been broken in (for example at 10,000 km), and $KF_n$ the NOx emissions of an old engine (for example at 100,000 km). Moreover, the method is explained here for 3 component performance graphs only by way of example. The number of component performance graphs n that are used is any whole number greater than or equal to one. The performance graphs $KF_1$, $KF_2$, . . . $KF_n$, are normalized, e.g. represented in normalized performance graphs $KF_{1norm}$, $KF_{2norm}$, and . . . $KF_{nnorm}$, by means of normalization functions $N_1$, $N_2$, and . . . $N_n$. The normalization functions need not be linear, but instead can be, for example, exponential functions. In general, the range of the normalized performance quality is between 0 and 255, for each value of torque and engine speed, where the convention is used that low values are "good" values, whereas high values are "bad"values. This convention could as easily be inverted. In other words, one byte of data is used to describe the value of the performance quality, which in general is sufficient. If higher precision is required, a correspondingly larger range may be used, for example two bytes. The reason for normalization of the performance graphs is to make it possible to compare the functional values of the performance qualities with one another. Subsequently, the normalized performance data is transformed from a representation of engine speed versus torque to a representation of engine speed versus power output. Obviously, the sequence of the steps of normalization and transformation can be reversed. In the next step, the transformed and normalized component performance graphs are then combined into a composite efficiency performance graph. One possibility of combination is the addition of the three or more performance graphs that have been multiplied by weighting factors $\alpha_1, \alpha_2, \ldots \alpha_n$. In the composite efficiency performance graph GKF thus established, an optimal path through the efficiency performance graph can be determined by application of a suitable method. An example of a suitable method is determining the path with low values, i.e., the sum of the component data values should be as small as possible with constantly increasing power output and engine speed.

The calculation can be performed online during operation of the vehicle, while a strategy can be predetermined by an appropriate choice of the weighting factors $\alpha_1, \alpha_2, \ldots \alpha_n$ and/or the normalization functions $N_1, N_2,$ and $\ldots N_n$. In addition, it is possible for individual values of the component performance data that are incorporated in the method to be measured by suitable sensors during operation of the vehicle so that the method may use with appropriately revised component performance data $KF_1, KF_2, \ldots KF_n$. In other words, the method begins with reference component performance data established on the test stand that then are updated during operation of the vehicle through the measurement of suitable component performance data so that an up-to-date optimum transmission characteristic curve essentially always can be determined online during operation of the vehicle, given that a desired strategy is specified.

Figure 2:
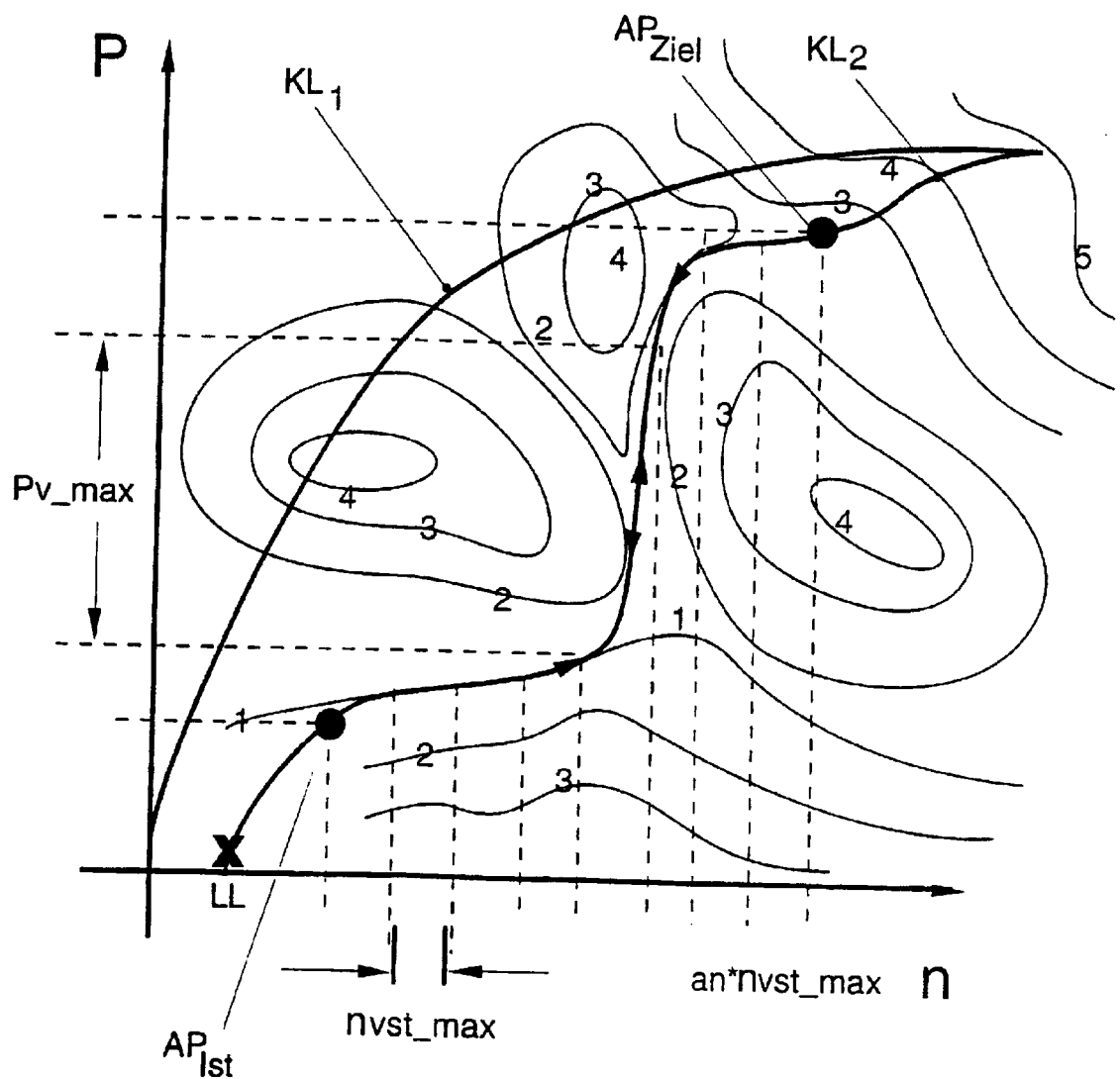
FIG. 2 shows an example of an operation characteristic curve in an efficiency performance graph.

FIG. 2 shows an example of an optimum path through an efficiency performance graph that is generated using the method explained in FIG. 1, keeping in mind that it is of course also possible to generate an efficiency performance graph from just one performance graph. Shown in top view are contour lines of a performance quality, for example NOx emissions, where larger values represent higher emissions, i.e., are "bad." The heavy top line $KL_1$ indicates, by way of example, a hypothetical transmission characteristic curve in which the engine speed n is increased appropriately to produce a greater power output. In the process, the course of the hypothetical transmission characteristic curve $KL_1$ is such that it traverses operating regions corresponding to as many emissions maxima as possible, which is to say that this transmission characteristic curve produces poor emissions behavior. In contrast, the "optimum" transmission characteristic curve $KL_2$ expressly avoids regions of higher emissions, i.e higher values in the efficiency performance graph, so that substantially improved emissions behavior is achieved.

The optimum path through the efficiency performance graph can be calculated with the method below, which assumes that the reaction time of the engine is faster than the transmission reaction time. Reaction time is defined as the time that a subassembly needs before a new operating point is reached. In the case of a transmission, this is the time required to set a new drive ratio, and in the case of an engine it is the time required to achieve a new torque.

A time cycle $T_x$ is defined that is determined by the maximum program run time of the target point calculation process. By means of a driving test, the maximum power adjustment capability ($P_{vst\_max}$) of the engine per time cycle $T_x$ is determined a single time. In addition, the maximum adjustment capability ($n_{vst\_max}$) of the transmission per time cycle $T_x$ is also determined a single time via a driving test.

The path through the efficiency performance graph from the actual value $AP_{ist}$ to the target value $AP_{end}$ is subdivided into $a_n$ engine speed steps. LL indicates the idling value the number $a_n$ of engine speed steps is calculated from the distance between the actual value $AP_{ist}$ and the target value $AP_{end}$ along with the maximum transmission adjustment capability $n_{vst\_max}$. It is now possible to adapt the power output change characteristics by calculating, in accordance with a selectable strategy of handling and/or comfort characteristics, such items as the path of least change in the performance quantity, using a suitable optimization method. The maximum power adjustment capability $P_{vst\_max}$ determines the boundary conditions. If, in the $i^{th}$ step, the power output change $P_{vst\_i}$ is greater than the maximum power adjustment capability $P_{vst\_max}$, the transmission adjustment interval $n_{vst}$ is reduced until the new $i^{th}$ power output adjustment capability $P_{vst\_i\_new}$ is equal to the maximum power output adjustment capability $P_{vst\_max}$. However, if the power output adjustment capability $P_{vst\_i}$ in the $i^{th}$ interval is less than the maximum power output adjustment capability, the transmission adjustment interval $n_{vst\_i}$ is set equal to the maximum interval $n_{vst\_max}$. The number i of the interval in question is a natural number less than or equal to the number $a_n$ of engine speed steps.

For calculation of the optimal path through the efficiency performance graph, it is of course possible to use different efficiency performance graphs for different engine conditions and/or driving conditions, for example an efficiency performance graph that describes a cold engine or an efficiency performance graph that describes an engine at operating temperature.

Figure 3:
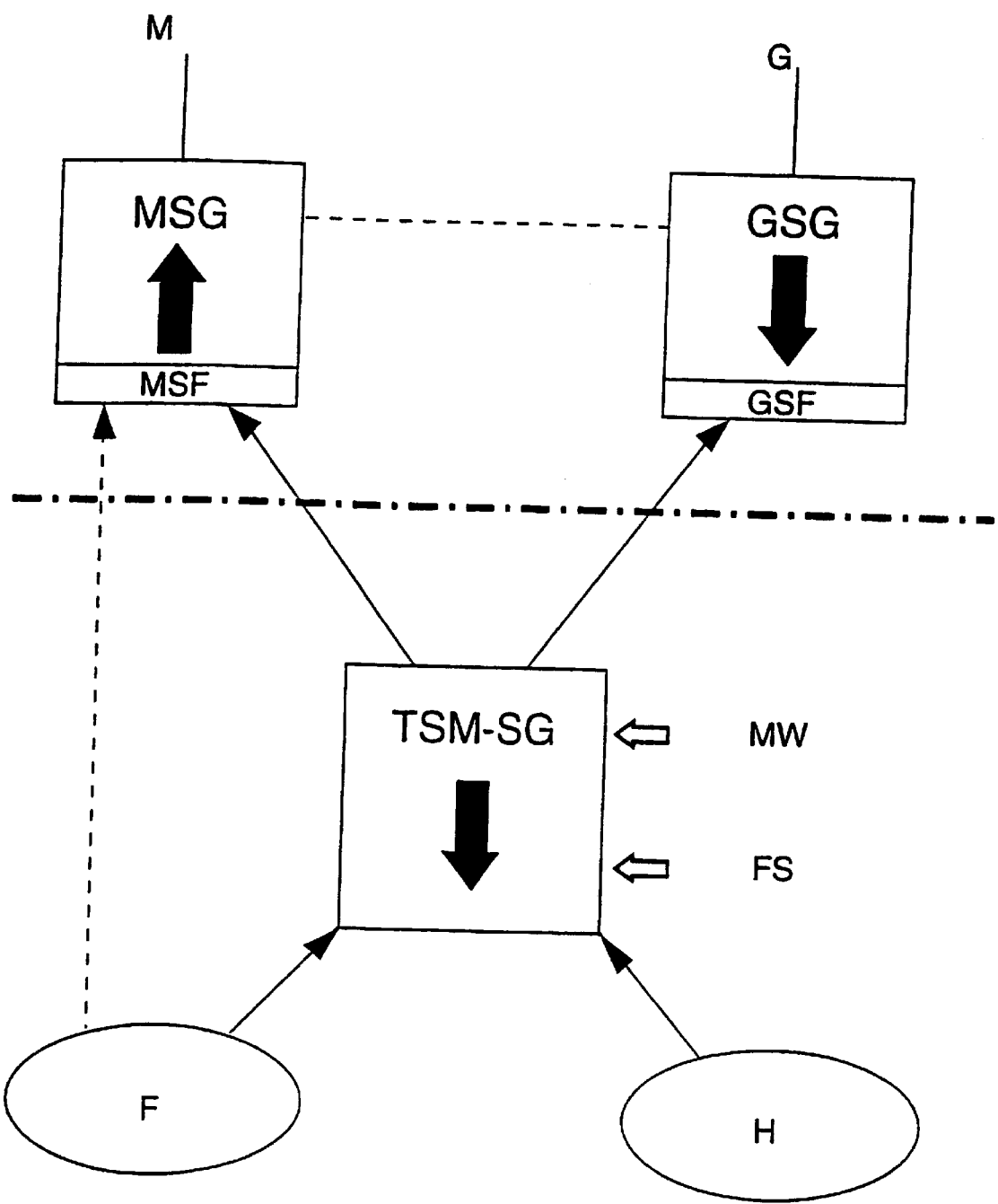
FIG. 3. shows the functional structure of apparatus for carrying out drive train management.

FIG. 3 describes the functional structure of a device for carrying out drive train management. The device includes three processing units, which may be microcomputers or other digital signal processors, specifically the drive train management control unit TSM-SG, the engine control unit MSG, and the transmission control unit GSG. These units may be interconnected by a CAN bus. The drive train management control unit TSM-SG is provided with signals representing a driver command F and a manufacturer command H. The driver command F can be a power requirement expressed by a particular position of the pedal position sensor (gas pedal). The manufacturer command H includes a strategy relating, for example, to exhaust, fuel consumption, comfort, etc. In addition, measured values MW from sensors are entered into the drive train management control unit TSM-SG, for example to supplement the performance data and the driver's strategy FS. The drive train management control unit TSM-SG calculates the optimal value through a corresponding efficiency performance graph at a power output required by the driver and delivers the pertinent regulated quantities, i.e. fuel injection quantity M__E and engine speed n, to the engine control unit MSG or the transmission control unit GSG. The appropriate control parameters are then supplied to the engine M and/or the transmission G by the engine control unit MSG and transmission control unit GSG. The transmission G is a continuously variable transmission (CVT transmission). An information exchange I takes place between the engine control unit and the transmission control unit as a safety function. In addition, a safety function MSF is also implemented in the engine control unit MSG, for example in response to the kick-down function of the pedal position sensor (gas pedal), so that power is directly controlled by the driver command (see dashed line). A safety function GSF is likewise implemented in the transmission control unit GSG in the form of a reserve strategy.

The functionality of the TSM-SG can also be located in the engine control unit or transmission control unit.

While there has been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

What is claimed is:

1. A method for continuously managing the operation of the drive train of a motor vehicle having an engine and a CVT transmission comprising:

sensing engine speed;

sensing operator control representing desired power output;

providing data representing a drive train composite performance quality characteristic as a function of power output and engine speed, said composited performance quality characteristic being calculated from a combination of a plurality of weighted and normalized component performance characteristics for each value of power output and engine speed, each weighted and normalized component performance characteristic being computed from a component performance characteristic using a separate normalization function and each being multiplied by a weighting function;

computing incremental changes in engine speed and power output with the objective of achieving said desired power output by control of engine speed and power output in a manner which represents optimum operation with respect to said composite performance quality characteristic for the changed engine speed and power output; and controlling said engine and said transmission to implement said computed changes in engine speed and power output.

2. A method in accordance with claim 1, wherein said weighting function is time-dependant.

3. A method in accordance with claim 1, wherein said composite performance quality characteristic is calculated using a plurality of component performance characteristics for the same performance quality.

4. A method in accordance with claim 1, wherein of said composite performance characteristics is calculated from component performance characteristics for different performance qualities.

5. A method in accordance with claim 1, wherein one or more of said component performance characteristics is supplement by the measurement of performance characteristics during driving operation.

6. A method in accordance with claim 1, wherein said optimization is performed relative to one or more characteristics selected from the group including fuel consumption, emissions NOx emissions, particulate emissions and passenger comfort.

7. A method in accordance with claim 1, wherein a maximum possible incremental adjustment capability of the power output per predetermined time cycle and a maximum possible incremental engine speed adjustment capability per said time cycle are established by a driving test, and wherein said computed incremented changes are constrained to be less than said maximum possible incremental adjustments.

8. Apparatus for continuously managing the operation of the drive train of a motor vehicle having an engine responsive to an engine control signal and a CVT transmission responsive to a transmission control signal, comprising:

an engine speed sensor providing engine speed signals;

and operator control sensor providing signals representing desired power output;

an engine control unit for providing engine control signals in response to supplied power output signals;

a transmission control unit for providing transmission control signals in response to supplied engine speed control signals;

and a processor, responsive to said engine speed signals and said desired power output signals, including a control program and a database providing composite drive train performances quality characteristics as a function of engine power output and engine speed, said composite drive train performance quality characteristics being calculated form a combination of a plurality of weighted and normalized component performance characteristics for each value of power output and engine speed, each weighted and normalized component performance characteristic being computed from a component performance characteristic using a separate normalization function and being multiplied by a weighting function, said control program continuously computing said power output signals and engine speed signals with the objective of achieving said desire power output by control of engine speed and power output in a manner which represents optimum operation with respect to said composite performance quality characteristics.

9. Apparatus in accordance with claim 8, wherein said program provides a power output signal which causes said engine control unit to provide an engine control signal corresponding to fuel injection quantity and provides said engine speed signal which causes said transmission control unit to provide transmission control signals corresponding to drive ratio.

10. Apparatus in accordance with claim 8 wherein said control units are interconnected by a bus.

11. Apparatus in accordance with claim 10, wherein said bus is a CAN bus.

12. A method for continuously managing the operation of the drive train of a motor vehicle having an engine and a CVT transmission comprising:

sensing engine speed;

sensing operator control representing desired power output;

providing data representing a drive train composite performance quality characteristic as a function of power output and engine speed, said composited performance quality characteristic being calculated from a combination of a plurality of weighted component performance characteristics for each value of power output and engine speed, each weighted component performance characteristic being computed from a component performance characteristic multiplied by a time-dependent weighting function;

computing incremental changes in engine speed and power output with the objective of achieving said desired power output by control of engine speed and power output in a manner which represents optimum operation with respect to said composite performance quality characteristics for the changed engine speed and power output; and controlling said engine and said transmission to implement said computed changes in engine speed and power output.

13. A method for continuously managing the operation of the drive train of a motor vehicle having an engine and a CVT transmission comprising:

sensing engine speed;

sensing operator control representing desired power output;

providing data representing a drive train composite performance quality characteristic as a function of power output and engine speed, said composited performance quality characteristic being calculated from a combination of a plurality of weighted component performance characteristics for each value of power output and engine speed, each weighted component characteristic being computed from a component performance characteristic multiplied by a weighting function;

establishing a maximum possible incremental adjustment capability of the power output per predetermined time cycle and a maximum possible incremental engine speed adjustment capability per time cycle by a driving test;

computing incremental changes in engine speed and power output with the objective of achieving said desired power output by control of engine speed and power output in a manner which represents optimum operation with respect to said composite performance quality characteristic for the changed engine speed and power output, wherein said incremental changes are constrained to be less than said maximum possible incremental adjustments; and controlling said engine and said transmission to implement said computed changes in engine speed and power output.

* * * * *